(12) United States Patent
Neatherlin

(10) Patent No.: US 11,313,125 B2
(45) Date of Patent: Apr. 26, 2022

(54) MOBILE MODULAR FOUNDATION SYSTEMS AND METHODS FOR TRANSPORTING SAME

(71) Applicant: GROUNDFORCE IP, LLC, Navasota, TX (US)

(72) Inventor: Kenneth L. Neatherlin, Bryan, TX (US)

(73) Assignee: Ground Force IP, LLC, College Station, TX (US)

( * ) Notice: Subject to any disclaimer, the term of this patent is extended or adjusted under 35 U.S.C. 154(b) by 0 days.

(21) Appl. No.: 16/574,017

(22) Filed: Sep. 17, 2019

(65) Prior Publication Data

US 2020/0217073 A1 Jul. 9, 2020

Related U.S. Application Data

(60) Provisional application No. 62/732,431, filed on Sep. 17, 2018.

(51) Int. Cl.
*E04C 2/52* (2006.01)
*E04C 2/06* (2006.01)
*E04B 5/04* (2006.01)

(52) U.S. Cl.
CPC ............... *E04C 2/526* (2013.01); *E04B 5/04* (2013.01); *E04C 2/06* (2013.01)

(58) Field of Classification Search
CPC ..... B60P 3/40; E04B 5/04; E04C 2/06; E04C 2/526; E04C 5/08
See application file for complete search history.

(56) References Cited

U.S. PATENT DOCUMENTS

| | | | |
|---|---|---|---|
| 3,795,336 A | * | 3/1974 | Acker .................. B60P 1/6445 414/458 |
| 3,811,722 A | * | 5/1974 | Jones .................. E04B 1/34352 296/168 |
| 3,834,111 A | | 9/1974 | Acker et al. |
| 3,929,241 A | | 12/1975 | Putnam |
| 3,944,242 A | * | 3/1976 | Eubank .................... B28B 1/14 280/30 |
| 4,200,305 A | | 4/1980 | Eubank |
| 4,231,709 A | | 11/1980 | Corsetti |
| 4,320,607 A | | 3/1982 | Eubank |
| 4,405,144 A | | 9/1983 | Chambers |
| 4,452,555 A | | 6/1984 | Calabro |
| 4,753,450 A | * | 6/1988 | Wibben .................... E04G 1/24 180/19.2 |
| 4,762,192 A | | 8/1988 | Maxwell |
| 5,129,779 A | | 7/1992 | Tripplett |
| 5,232,234 A | * | 8/1993 | McCombs ........... B62D 53/067 280/149.2 |
| 5,246,241 A | * | 9/1993 | Baver ...................... B60P 1/02 280/407.1 |
| 5,417,539 A | * | 5/1995 | van der Wal ............. B60P 3/00 180/906 |

(Continued)

*Primary Examiner* — James M Ference
(74) *Attorney, Agent, or Firm* — McAughan Deaver PLLC

(57) ABSTRACT

A modular foundation system comprises a concrete reinforced matrix having embedded pre-tensioned components and a recessed tension bolster region adjacent the lower surface of the foundation at each end, and a pair of lifting safety bars partially embedded in the foundation within the recess and terminating at the end of the foundation.

20 Claims, 15 Drawing Sheets

(56) References Cited

U.S. PATENT DOCUMENTS

| | | | | |
|---|---|---|---|---|
| 6,101,779 | A * | 8/2000 | Davenport | E04B 1/04 |
| | | | | 52/223.6 |
| 6,254,132 | B1 * | 7/2001 | Lindsay | B62D 21/02 |
| | | | | 280/789 |
| 6,467,223 | B1 * | 10/2002 | Christley | E04B 5/04 |
| | | | | 52/143 |
| D480,857 | S | 10/2003 | Wareham | |
| 6,681,535 | B1 * | 1/2004 | Batchelor | B62D 21/12 |
| | | | | 52/143 |
| 6,821,066 | B2 | 11/2004 | Wehrli | |
| 7,065,926 | B2 * | 6/2006 | Brandt | B62D 21/20 |
| | | | | 280/789 |
| 7,112,029 | B1 | 9/2006 | Neatherlin | |
| 7,165,370 | B1 * | 1/2007 | Wolfe | E04B 1/14 |
| | | | | 52/122.1 |
| 8,876,148 | B2 * | 11/2014 | Sartini | B60G 9/00 |
| | | | | 280/656 |
| 9,062,451 | B1 * | 6/2015 | Wilson, Jr. | B60P 3/40 |
| 10,011,980 | B1 | 7/2018 | Shipps | |
| 10,155,467 | B2 | 12/2018 | Neatherlin | |
| 2015/0054256 | A1 * | 2/2015 | Graham | B60P 3/06 |
| | | | | 280/441.2 |
| 2015/0203020 | A1 * | 7/2015 | Neatherlin | B60P 3/40 |
| | | | | 414/462 |
| 2019/0127940 | A1 | 5/2019 | Kaufman et al. | |
| 2019/0218741 | A1 | 7/2019 | Delorme | |
| 2019/0257081 | A1 | 8/2019 | Heatly | |
| 2020/0217073 | A1 * | 7/2020 | Neatherlin | E04C 5/08 |

* cited by examiner

MOBILE MODULAR FOUNDATION SYSTEMS AND METHODS FOR TRANSPORTING SAME

CROSS REFERENCE TO RELATED APPLICATIONS

This application claims benefit of and priority to U.S. Patent Application No. 62/732,431, entitled Tension Component Foundation Systems and Methods of Transport, filed on Sep. 17, 2018, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to modular concrete foundation systems and methods for lifting and transporting same

Description of the Related Art

U.S. Pat. No. 3,834,111 entitled "Method For Transporting Building Modules" discloses "A building module transporter for connection to a towing vehicle comprising a building module and module carriers attached to end walls of the module and resting on carrier supports. The carriers are firmly secured to the module at vertically spaced points to suspend the module between them and to permit the raising and lowering of the suspended module by pivoting the carriers about horizontal axes with respect to the supports. Means is provided for moving the module with respect to the carriers in a lateral direction to facilitate the precision alignment of the module with a foundation at the building site. The spaced connection points between the module and the carriers tension a lower portion of the suspended building and place an upper portion thereof in compression."

U.S. Pat. No. 4,200,305 entitled "Trailer assembly for carrying overwidth loads" discloses "A trailer assembly for carrying overwidth loads such as large rectangular concrete slabs. The trailer includes two separate units, a front unit and a rear unit. Each unit includes a frame mounted on a set of tandem wheels. The front unit has upper and lower frames rotatably connected together, allowing the wheels to turn with respect to the upper frame. A tongue is hingedly connected to the front unit. It has a hitch for connection to the towing vehicle and a compression device to apply weight to the hitch for compressive connection with the towing vehicle. Longitudinal cross members are mounted across the front and rear units to support the load. The cross members can be removed and stored parallel to the length of the units for legal width return trip towing. On return trip, the rear unit is towed reverse to the direction towed while loaded. Also disclosed is an embodiment employing two units the same or similar to the front unit to enable being moved laterally to facilitate parking in close space."

U.S. Pat. No. 7,112,029 entitled "Carrier Apparatus and Method" discloses "A carrier apparatus and method includes a pair of oppositely positioned carriers. At least one pair of steerable wheels is connected to at least one of the oppositely positioned carriers. A movable neck is connected to each of the oppositely positioned carriers and by compressive engagement to an object to be carried such that neither the movable neck, nor the pairs of steerable wheels, nor the pair of oppositely positioned carriers are underneath the object."

U.S. Pat. No. 10,155,467 entitled "Systems And Methods For Transporting A Structure" discloses "A system and method for lifting and moving a structure comprises at least two bolster assemblies configured to engage substantially opposing ends of the structure, a plurality of tensioned components extending between the bolster assemblies, applying a compressive force to clamp the bolster assemblies to the structure, and applying a lifting force to the bolster assemblies to lift the structure."

The present inventions are directed to improve modular concrete foundation systems configured to be transported and systems and methods for transporting same.

BRIEF SUMMARY OF THE INVENTION

A brief non-limiting summary of one of the many possible embodiments of the present invention comprises a modular foundation with a top surface on which a structure may be erected; a load reaction column comprising a first structural component and a second structural component, the reaction column embedded in the foundation system at the junction of each side beam with its associated end beam such that the second component is positioned at a bottom surface of the side beam; a plurality of pre-tensioned wire cables embedded in the foundation system along each side beam spanning between the reaction columns associated with each side beam; a lifting safety bar adjacent each reaction column and comprising a length of rod a portion of which is embedded in the foundation system and the remaining portion of which is exposed and not embedded in the foundation system, an end of the exposed rod is substantially flush with an outer surface of the end beam; and a tension bolster region defined by each end beam between the side beams and having a depth along the side beams defined by an outer surface of the end beam and an outer surface of the embedded lifting safety bar.

Another brief non-limiting summary of one of the many possible embodiments of the present invention comprises a lifting and transporting system for a modular foundation system with aa first and second tension bolsters each comprising a beam having first and second safety bar openings adjacent each beam end, the openings defining a tension axis, first and second sets of reaction lugs extending away from the beam in plane with the tension axis, a plurality of tension cable openings disposed between the first and second set of reaction lugs and aligned with the tension axis plane, each tension bolster configured to mate with an end of a modular foundation such that safety bars associated with the modular foundation can be are received in the first and second safety bar openings; a first and second compression bolsters each comprising a beam having first and second guide pins adjacent each beam end, a compression surface on one face of the beam between the guide pins, first and second sets of reaction lugs extending away from the compression surface and normal to the compression surface, each compression bolster configured to mate with the end of the modular foundation such that the guide pins can be received in guide pin openings in the modular foundation and the compression surface can contact a portion of the end beam of the modular foundation; a plurality of tension cables configured to extend between the first and second tension cable openings when the first and second tension bolsters are operatively coupled to a modular foundation; a first and second actuation assembly each comprising a frame and at least one arm rotatably coupled to the frame, the at least one arm comprising a fork at one end and configured to engage the tension bolster reaction lug, and a second end, the arm configured to operatively couple to the compression bolster reaction lugs between the fork and the second end; and a first and second hydraulic piston, each coupled between the frame and the second end of the arm, such that when the tension bolsters and compression bolsters are operatively coupled to a modular foundation, extension of the hydraulic pistons causes the arms to rotate about the tension bolster reaction lugs and press the compression bolsters into the modular foundation sufficient to lift and transport the modular foundation.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

Figure 1A:
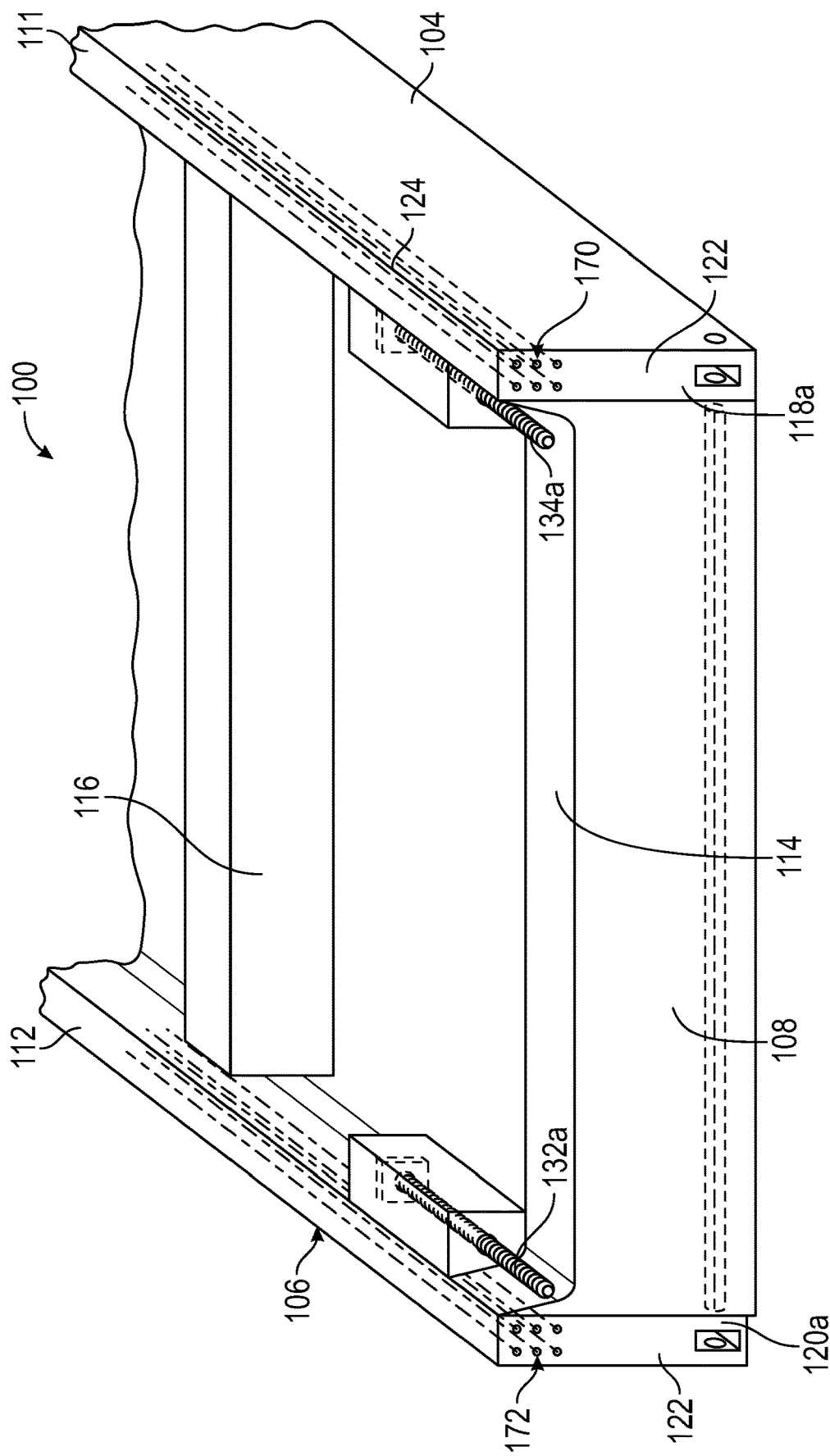
FIG. 1A illustrates an underside view of a portion of a modular foundation system incorporating one or more of the inventions disclosed herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above, and the written description of specific structures and functions below are not presented to limit the scope of what I have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

It also should be noted that, in some possible embodiments, the functions may occur out of the order noted in the figures. Other steps and methods may be conceived that are equivalent in function, logic, or effect to the illustrated figures.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

To begin, the detailed background and history of my inventions disclosed herein are set forth in my related patents, U.S. Pat. No. 7,112,029, entitled Carrier Apparatus and Method," and U.S. Pat. No. 10,155,467, entitled Systems and Methods for Transporting a Structure." The entire contents of each related patent are incorporated herein by reference for all purposes as if fully reprinted herein.

In general, the inventions disclosed herein for which protection is sought comprise modular foundation systems, and systems and methods for casting or forming modular foundation systems; and systems and methods for lifting and transporting modular foundation systems. Modular foundation systems according to the inventions disclosed herein are typically, but not exclusively formed form a concrete matrix including reinforcing materials, such as structural steel bar (e.g., rebar), tube, channel, and wire mesh. The use of these reinforcing materials is mostly understood by those skilled in the art of modular foundations, and will not be treated herein. In contrast, the inventions disclosed herein are directed to structural aspects of a modular foundation that permit the foundation to be repeatedly lifted, and to be transported over conventional road without causing failure, such as tension failure, of the foundation. It is well understood that concrete or cement-based foundations have superior compressive strength and poor tensile strength. For example, lifting a modular, concrete-based foundation (even with conventional reinforcement) likely will result in a transverse tension fracture. The inventions described herein allow a modular foundation, such as a concrete-based modular foundation not only to be lifted, but also transported.

One embodiment of the modular foundation system disclosed herein comprises pre-tensioned cables embedded in side beams of the foundation, and safety tension bars partially embedded in an interior portion of the foundation such that the embedded portion is recessed from the foundation end, and the exposed portion terminates at about the foundation end. A tension bolster is configured to fit in the recessed area of the foundation and operatively coupled to the safety tension bars at each of the foundation. In a preferred embodiment, the tension bolster is substantially shielded by the foundation with only a small portion of the bolster extending beyond the foundation. Once the tension bolster is coupled to the safety tension bars, the tension bolster can be used to lift the foundation and can be used as a safety feature during transportation.

For transporting a modular foundation, tension components, such as wire rope cables are spanned between the tension bolsters at each end of the foundation system. Each tension component is tensioned (e.g., stretched) to a load of about between 500 lbf and 1,000 lbf per tension component. Each tension component may be secured to locked to the tension bolster to create a structure against which a compressive force may be generated to clamp (compress) and lift the foundation system. Thus, one aspect of the inventions comprises a modular foundation system comprising a plurality of pre-tensioned cable embedded in the foundation along with a plurality of embedded lifting safety rods adjacent each end of the foundation system.

The tension bolster contemplated by the inventions disclosed herein may be operatively coupled to a modular foundation system and left in place, such for foundations that may be subject to repeated movements or lifting. Alternately, the tension bolster contemplated by the inventions disclosed herein may be operatively coupled to a modular foundation system and then removed, such for foundations that are not subject to repeated movements or lifting. In either situation the modular foundation system has no to very little additional structure emanating from the foundation.

A lifting and transporting device, such as a lifting frame and one or more load arms, may attach to each end of the modular foundation to apply a compressing force to the foundation, preferably adjacent the top portion of the foundation system to further clamp the foundation. Once the compressing force has been applied by the lifting and transporting device, the foundation may be lifted and transported. Another aspect of the inventions comprises adjustably lifting the structure to heights ranging between about 5 inches to about 15 feet above the ground, and preferably from about 5 inches to about 4.5 feet to allow transport over most roadways and roadway crossings.

Another aspect of the inventions comprises one or more motorized, steerable bogies configured to attach to the tension and compression bolsters for lifting and moving the structure. The bogies may be controlled by wired remote or wireless remote.

The inventions disclosed herein are adaptable for use with all kinds of structures that need to be lifted and transported. For example, and not for limitation, "structures" may include oilfield components, equipment sleds, transportation containers, or any other physical structure having compressive strength and little tensile strength. For convenience and clarity only, Applicant has chosen to disclose these inventions in the context of mobile, modular housing units having a concrete-based foundation having little tensile strength. It will be understood and appreciated after having the benefit of this disclosure that the inventions taught herein, and the protection sought for these inventions is not limited to the modular housing industry or housing units as the structure lifted and transported.

Another aspect of the inventions comprise casting or forming a modular foundation system from a mold in which a portion of the mold is formed from insulation material, and the insulation material becomes an operative part of the modular foundation system.

Turning now to descriptions of one or more of the many possible embodiments of the present inventions, FIG. 1A illustrates an underside perspective view of a modular foundation system 100 comprising a top surface 102 or floor, first and second sides 104 and 106, a first end 108, and a second end 110 opposite the first end 108 (not shown in FIG. 1A). It is preferred that the modular foundation system 100 be fabricated from a concrete matrix with appropriate metal reinforcement, as will be discussed in more detail below. As can be seen in FIG. 1A, the sides 104 and 106 also may function as beams 111 and 112 to support the floor 102. The first end 108 (and second end 110) may comprise a transverse beam 114 to support the floor 102. One or more other transverse beams 116 made be formed in the modular foundation system as needed or desired.

It is preferred that each of the first and second sides 104, 106 comprise at each end a load reaction column 118a, 118b and 120a, 120b. In some embodiments, like that illustrated in FIG. 1A, and now referring to FIG. 1B, the reaction columns 118, 120 preferably comprise a rectangular tube 122, such as a structural steel square tube with a wall thickness of more or less than a ¼ inch. The tube 122 may be joined to a length of C-channel 124, such as a structural steel channel, with a wall thickness of more or less than a ¼ inch. When metal components are used, joining of the components preferably comprises welding. The open ends 126 of the tube 122 made be covered with plates and welded closed, as well. Similarly, the open end of the channel 128 made be covered and welded as well. As illustrated in FIG. 1A, the load reaction columns 118a, 118b and 120a, 120b are cast or formed into the foundation system 100 at each end of sides 104 and 106. For concrete-based foundation systems, additional bonding points 130, such as T-heads, may be welded to the channel 124, the tube 122 or both to promote greater bonding with the matrix.

Figure 1C:
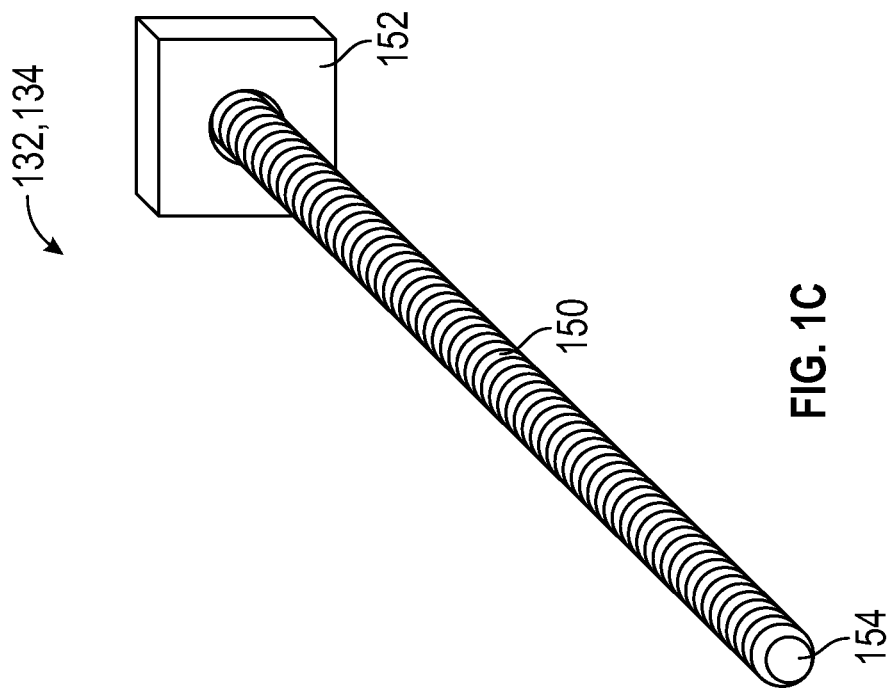
FIG. 1C illustrates one of many possible embodiments of a lifting safety bar suitable for use with modular foundation systems incorporating one or more of the inventions disclosed herein.
Figure 1B:
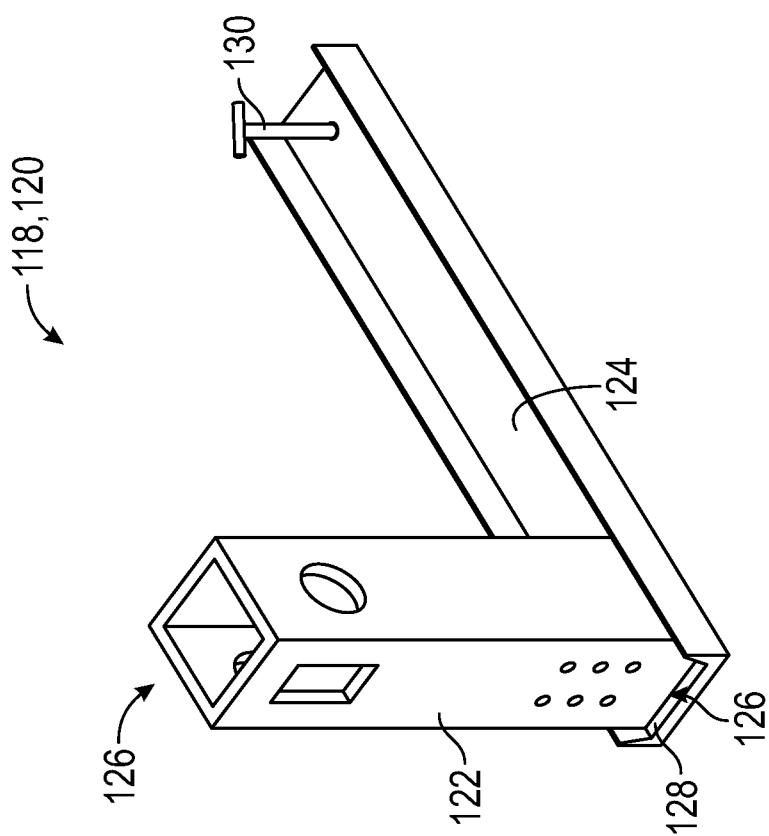
FIG. 1B illustrates one of many possible embodiments of a load reaction column suitable for use with foundation systems incorporating one or more of the inventions disclosed herein.

Referring back to FIG. 1A, the modular foundation system 100 may comprise a plurality of lifting safety bars 132a, 132b, 134a and 134b (132b and 134b not shown in FIG. 1A). As illustrated, lifting safety bars 132 and 134 may be embedded in the modular foundation system 100. Referring to FIG. 1C, the lifting safety bars 132 and 134 may comprise a length of threaded rebar 150, and one or more bonding plates 152 welded or otherwise joined to the rebar 150. As will be discussed in more detail below, it is preferred that the proximal end 154 of the safety bar 132, 134 be flush with the ends 108, 110 of the foundation system 100, and that a portion of the safety bar 132, 134 is left exposed and not embedded in the foundation system 100.

Also illustrated in FIG. 1A, are a plurality of pretensioned cables 170, 172 embedded in the side beams 111, 112. In a preferred embodiment, six ½ diameter wire cables are positioned in each side beam and tensioned to between about 500 lbf and 750 lbf while the concrete is poured and sets. Once the concrete has set, the tension can be released and the wire cables can be cut flush with the reaction columns 118, 120. For example, a cutting torch can be used to cut individual wire cables or individual wire strands in a wire cable in alternating fashion, one on each side, until all wire cables are severed. It will be appreciated that the reaction columns, 118, 120 and the pre-tensioned cables 170, 172 structurally cooperate with the lifting and transporting systems described below.

Figure 2:
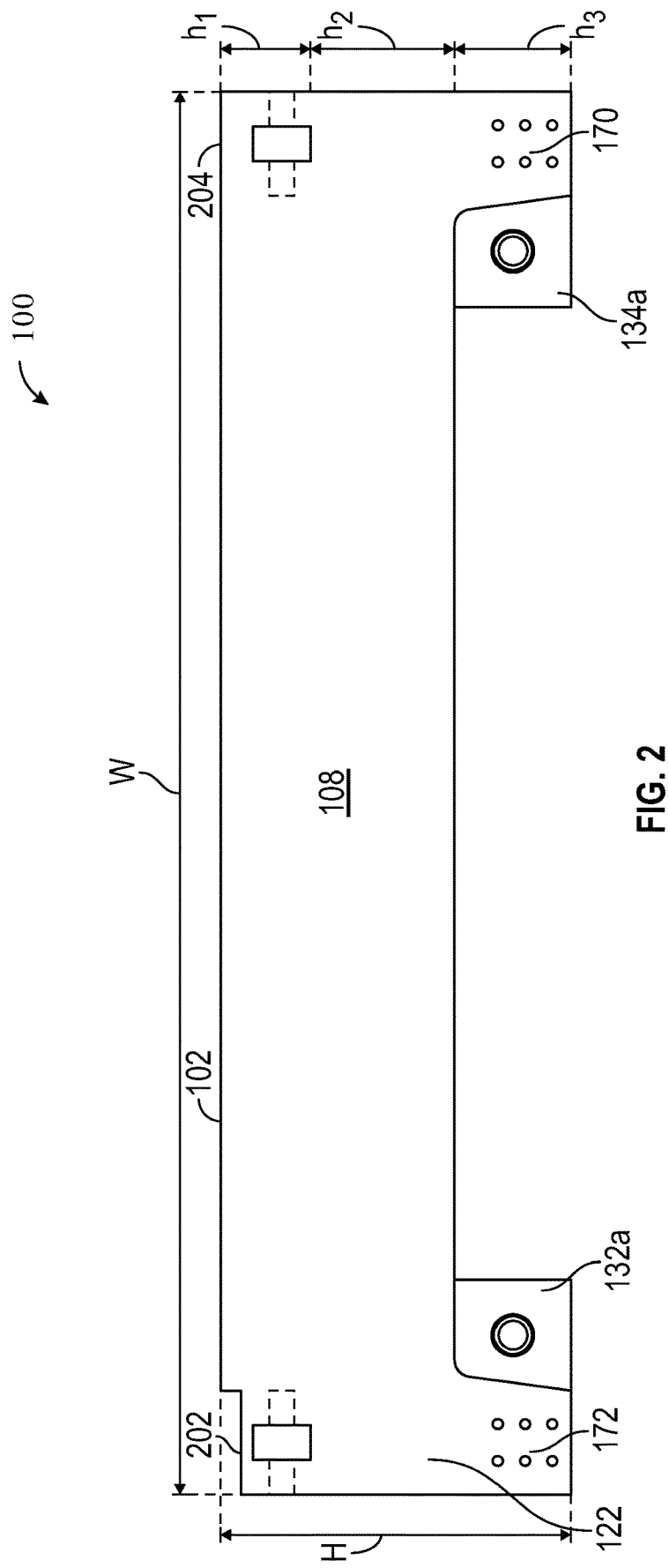
FIG. 2 illustrates an end view of a modular foundation system incorporating one or more of the inventions disclosed herein.

FIG. 2 illustrates an end view of foundation system 100 comprising load reaction columns 118, 120, composed of tubes 122 and channels 124. A plurality of pre-tensioned cables 170 and 172 are illustrated in each side beam and terminate in the reaction columns 118, 120. Lifting safety bars 132a and 134a are also illustrated. In this particular embodiment, the overall height "H" of the foundation system 100 may be about 20 inches, and may consist of a floor thickness "$h_1$" of between about 3 and 4 inches, a transverse beam 116 thickness $h_2$ of about 12 inches, and side beam thickness $h_3$ of about 4 to about 6 inches. The width of this particular foundation system 100 is about 12 feet.

Figure 3:
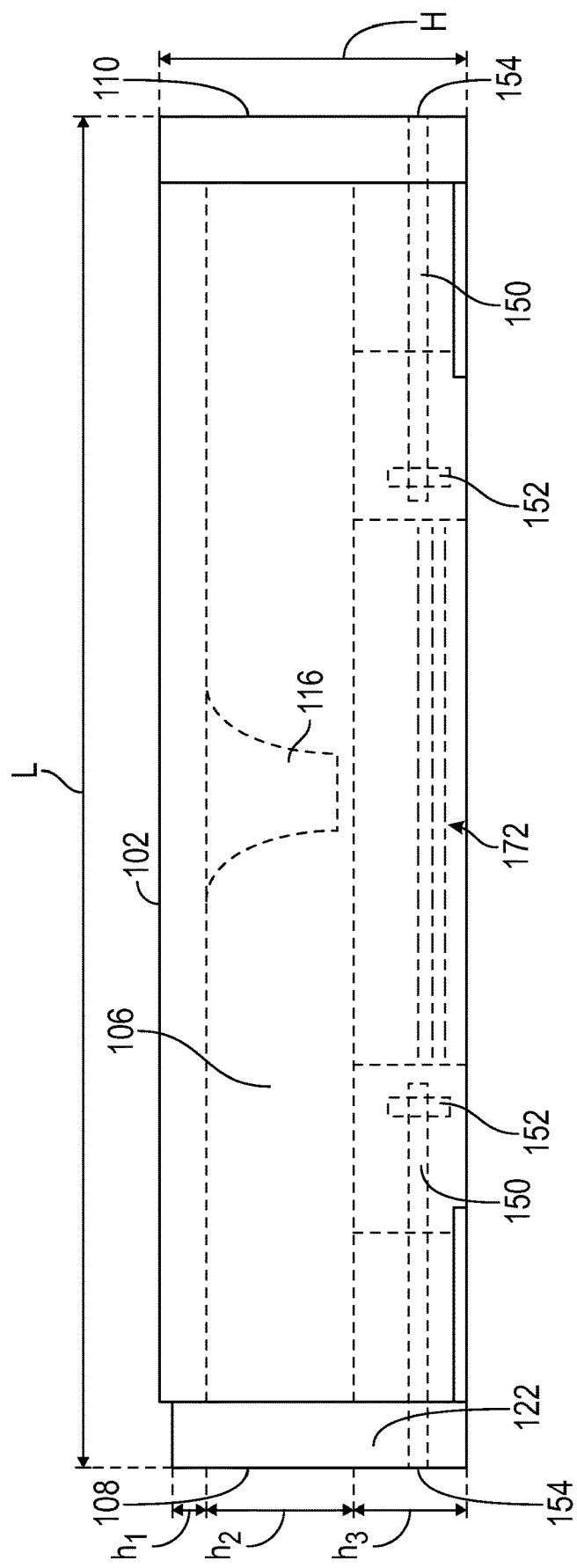
FIG. 3 illustrates a side view of a modular foundation system incorporating one or more of the inventions disclosed herein.

FIG. 2 also illustrates a floor 102 variation that can be implemented as needed or desired. If the building or structure to be erected on the modular foundation system 100 will utilize steel framing, such as structural steel columns, the top surface 126 of tube 122, which preferably is welded closed, is free 202 of foundation material (e.g., concrete) so that the framing columns may be welded directed to the load reaction columns 118, 120. Alternately, for wood framing, the foundation material (e.g., concrete) may cover 204 the top of the load reaction columns 118, 120. FIG. 3 illustrates a side view of the foundation system 100 of FIG. 2. The position of the lifting safety bars relative to the end of the foundation is shown.

Figure 4:
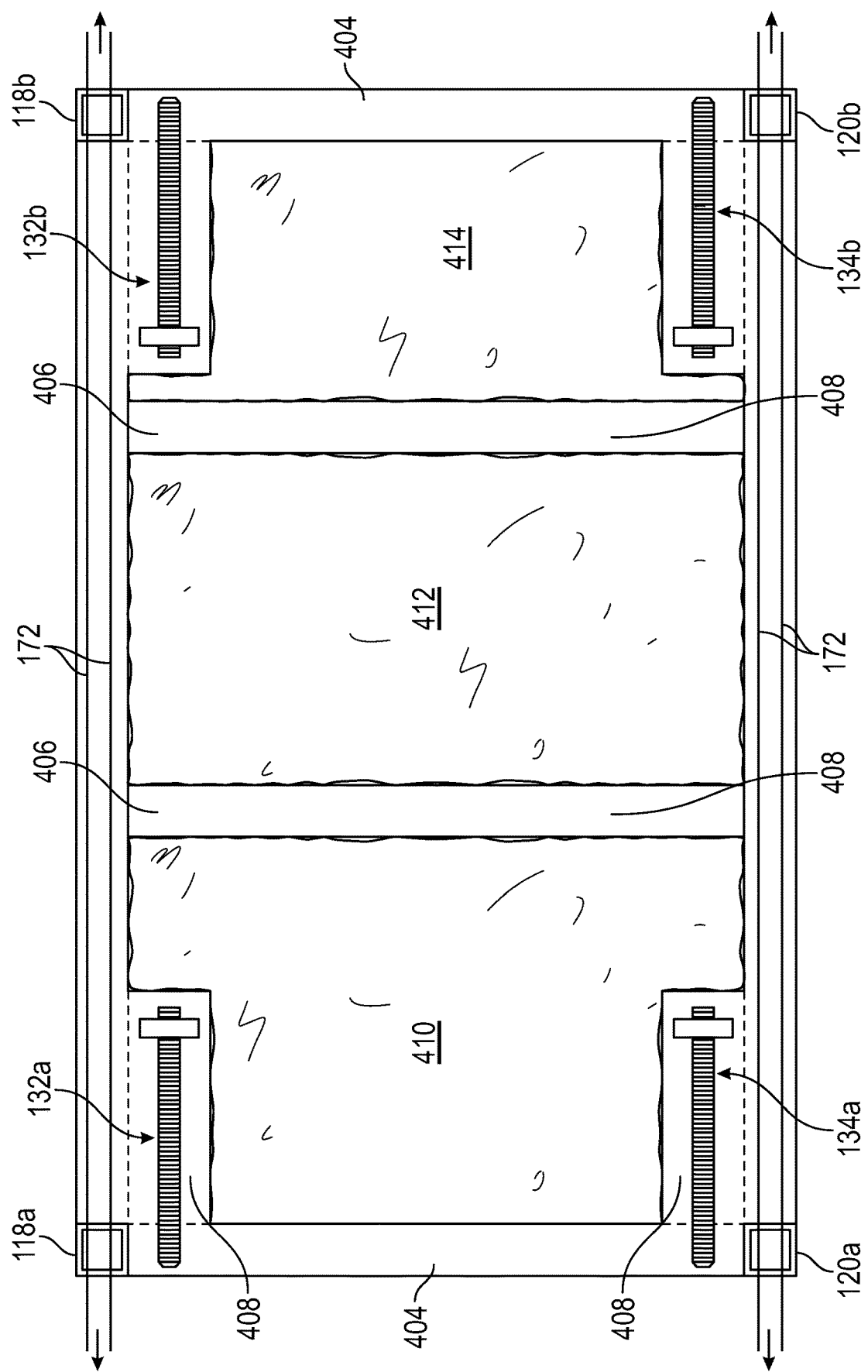
FIG. 4 illustrates one of many possible embodiments of a foundation form or mold useful for creating modular foundation systems incorporating one or more of the inventions disclosed herein.

FIG. 4 illustrates a form or mold 400 useful in creating modular foundation systems according to the inventions disclosed herein. The mold 400 may comprise a frame 400 configured to produce a foundation system of the desired length "L," desired width "W," and height "H." For this particular mold, the floor 102 is at the top of the mold 400. Those persons of skill having the benefit of this disclosure will appreciate that the mold 400 will comprise shielding and other structures that prevent concrete from filling those regions of the foundation system that should not have concrete. Those block outs or shielding will not be described further. Once the boundaries of the mold 400 are established a sheet of closed-cell foam 408, such as a polyethylene foam, may be placed in the mold 400, as shown. Additionally, closed-cell foam sections 410, 412 and 414 may be positioned in the mold 400 such that the voids for end transverse beams 404 and transverse beams 406 and lifting safety bars 132, 134 are formed.

Those persons of skill having the benefit of this disclosure also will appreciate that reinforcing bars and/or reinforcing mesh may be placed in the form 400 as required or needed to produce the foundation strength necessary of the particular purpose of the foundation system.

Once the mold 400 is ready, concrete may be poured into the mold 400 to fill the voids and create the modular foundation system contemplated by this disclosure. Once the concrete has cured, the foundation system may be removed from the mold 400 and the closed-cell foam will adhere to the concrete creating an insulated foundation system. Depending on the thicknesses of the closed-cell foam used, insulation ratings as high as an R39 or R40 may be obtained. In addition, the closed cell foam may have or may be given pesticide properties.

Figure 5:
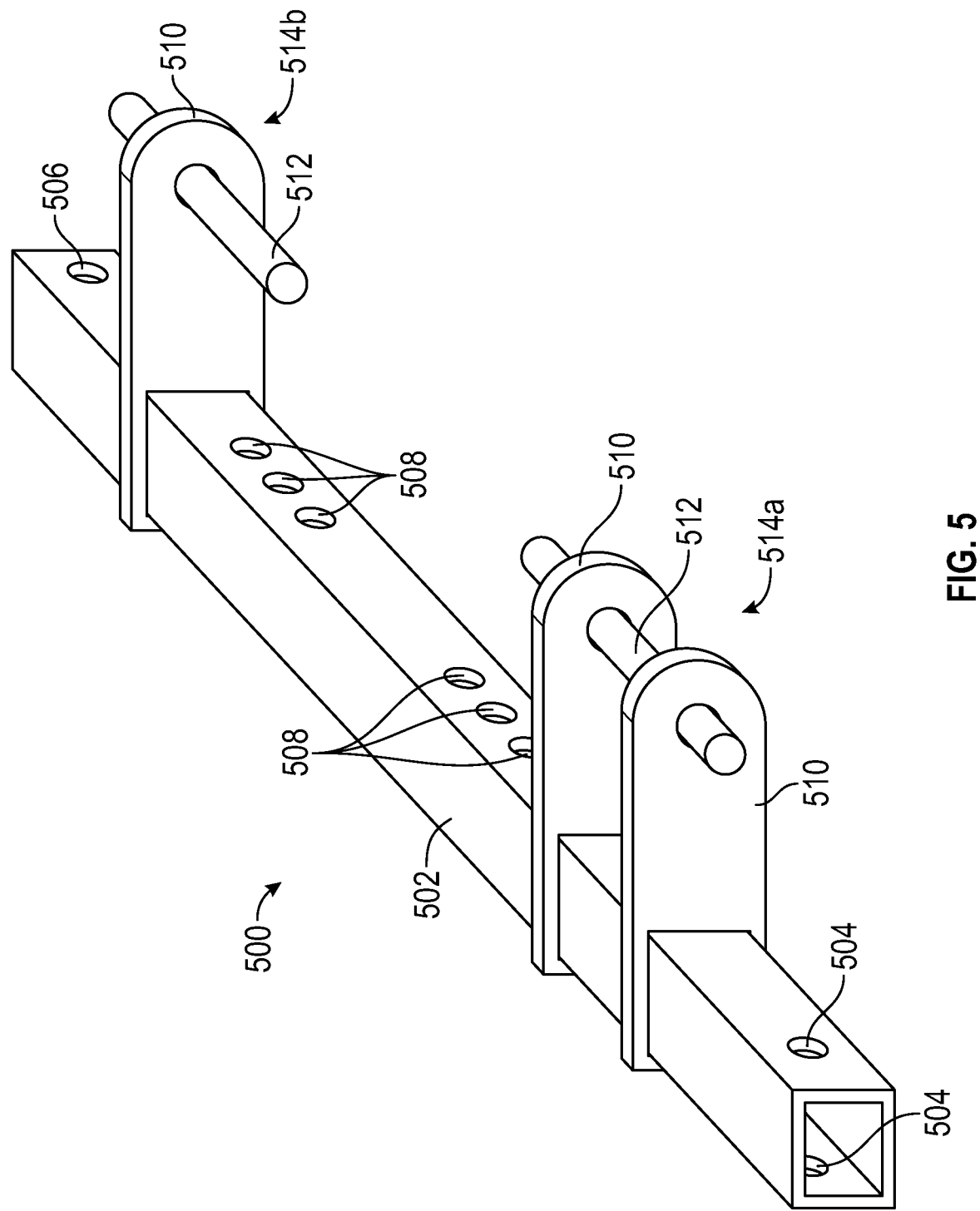
FIG. 5 illustrates one of many possible embodiments of a tension bolster suitable for with the modular foundation systems disclosed herein.
Figure 6:
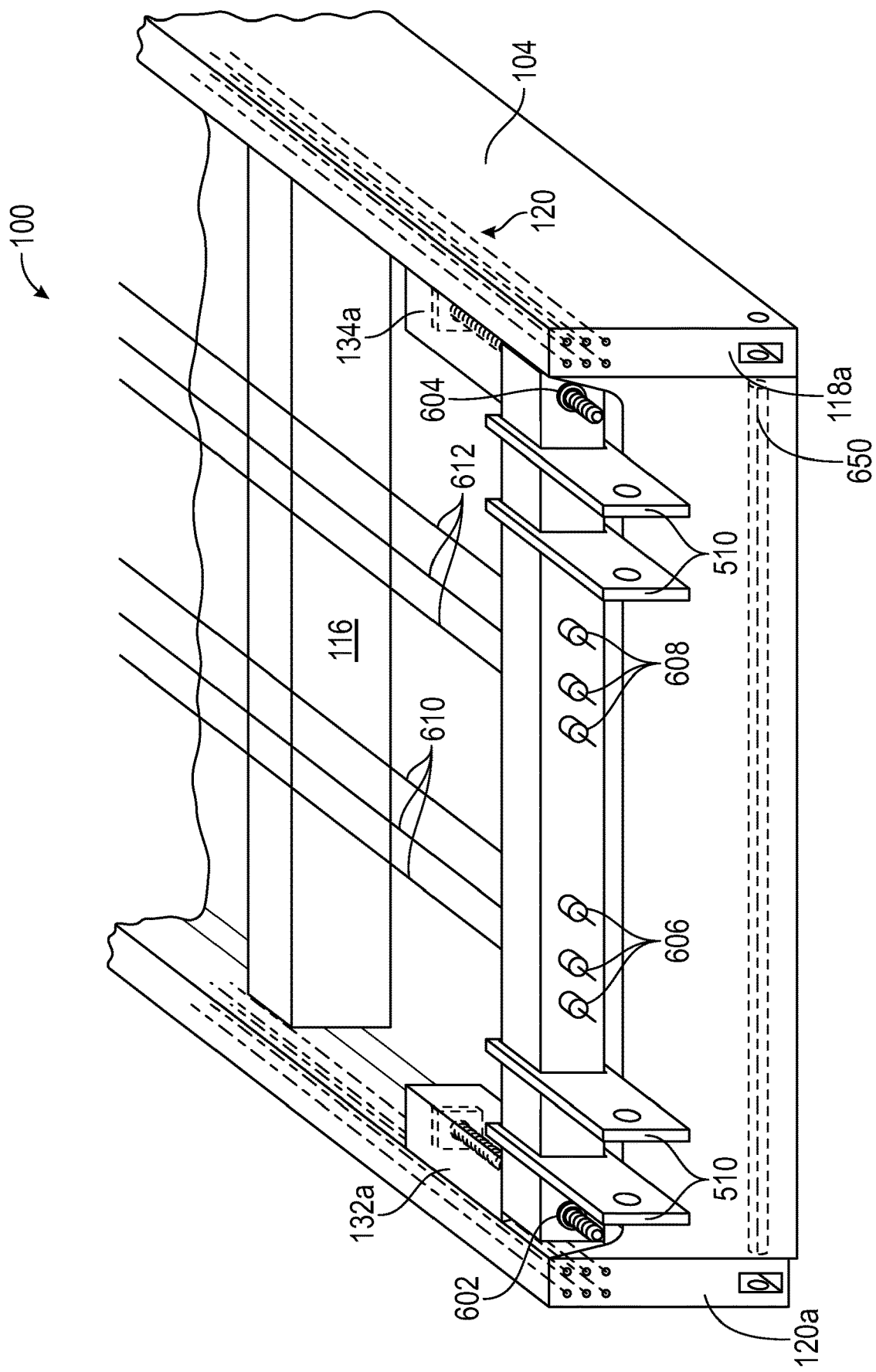
FIG. 6 illustrates an underside view of a portion of a modular foundation system with a tension bolster operatively connected thereto.

FIG. 5 illustrates aspects of an embodiment of a tension bolster 500 configured to operatively couple with the foundation systems disclosed herein to aid the lifting and transporting of foundation systems. The tension bolster 500 may comprise a body or frame 502 configured to engage the safety lifting bars 132, 134 described previously. Receivers or openings 504, 506 may be formed or located in the body 502 and configured to allow the safety lifting bars 132, 134 pass therethrough, as illustrated in FIG. 6. The frame 502 also comprises a plurality of openings 508 lying in the same plane as the safety lifting bars 132, 134. While two sets of three openings 508 are illustrated, the number and location along the frame is a design consideration well within the purview of a person of skill having benefit of this disclosure.

The tension bolster 500 also may comprise at least one reaction point 514 capable of reacting the forces involved in lifting and/or transporting the foundation system, as described more fully below. FIG. 5 illustrates an embodiment of a tension bolster 500 having two reaction points 514a and 514b adjacent ends of the bolster 500. Each reaction point 514 may comprise two lugs 510 with a rod or other structural member 512 spanning between the two lugs 510. A portion of a second reaction point 514b is illustrated with a lug 510 and member 512. It will be understood that that the second lug 510 has been omitted for clarity. As illustrated in FIG. 5, it is preferred that the receivers 504, the openings 508 and the members 512 all lie in a common plane.

Other embodiments of reaction point 514 are contemplated by these inventions. For example and not limitation, for a 12' by 40' foundation system it is preferred that the tension bolster 500 comprise two reaction point sets, where each set is located adjacent an end of the frame 502 (as illustrated in FIG.), and where each set comprises four lugs 510 and two members 512. See for example FIG. 10.

The tension bolster 500 may be fabricated by welding structural steel components. Other materials may be used subject to the strength and material property requirements.

FIG. 6 illustrates an underside view of a foundation system according to the inventions disclosed herein with a tension bolster 500 operatively coupled to the foundation system. It will be understood that only one end 108 of the foundation system 100 is illustrated.

As illustrated in FIG. 6, the tension bolster may be coupled to the foundation system 100 by inserting the safety lifting bars 132a and 134a into and through the receivers 504 and 506b in the tension bolster 500. Because the safety tension bar has threads, a nut 602 may be used to secure the tension bolster 500 to the foundation system 100. The nuts 602, 604 and safety lifting bars 132, 134 are preferably sized and configured to react the loads encountered by the lifting bar 500 during lifting and transporting the foundation system 100. It will be understood that a similar tension bolster 500 is operatively coupled to the other end 110 of the foundation system 100.

Once both tension bolsters 500 are coupled to the foundation system 100, one or more, and preferably a plurality of, tension components 610, 612, such as wire rope, cables or rods, are strung between the tension bolsters 500 and each end thereof is fed through a bolster opening 508, as illustrated in FIG. 6. A tension component fastener 606, 608 is used with each end of the tension component to lock the tension component 610, 612 to the tension bolsters 500. As described in my previous patents, a tensile force may be applied to each tension component, such as by a hydraulic rain, and the fastener 606, 608 used to lock in the tensile force. In presently preferred embodiments, the tension components comprise ½ inch wire rope, and each tension component is loaded with between about 500 lbf and 1,000 lbf of tension.

As illustrated in FIG. 6, it is preferred that the tension bolster 500 be at least partially shielded by the foundation system 100, with only portion of the reaction points 514 extending beyond the foundation system 100. It will now be appreciated that once the tension bolster 500 and tension components 610, 612 are operatively coupled to the foundation system, the tension bolster 500 and tension components 610, 612 may remain indefinitely with the foundation system 100. It is therefore preferred to minimize the amount by which the tension bolsters 500 protrude beyond the foundation system 100.

Figure 7:
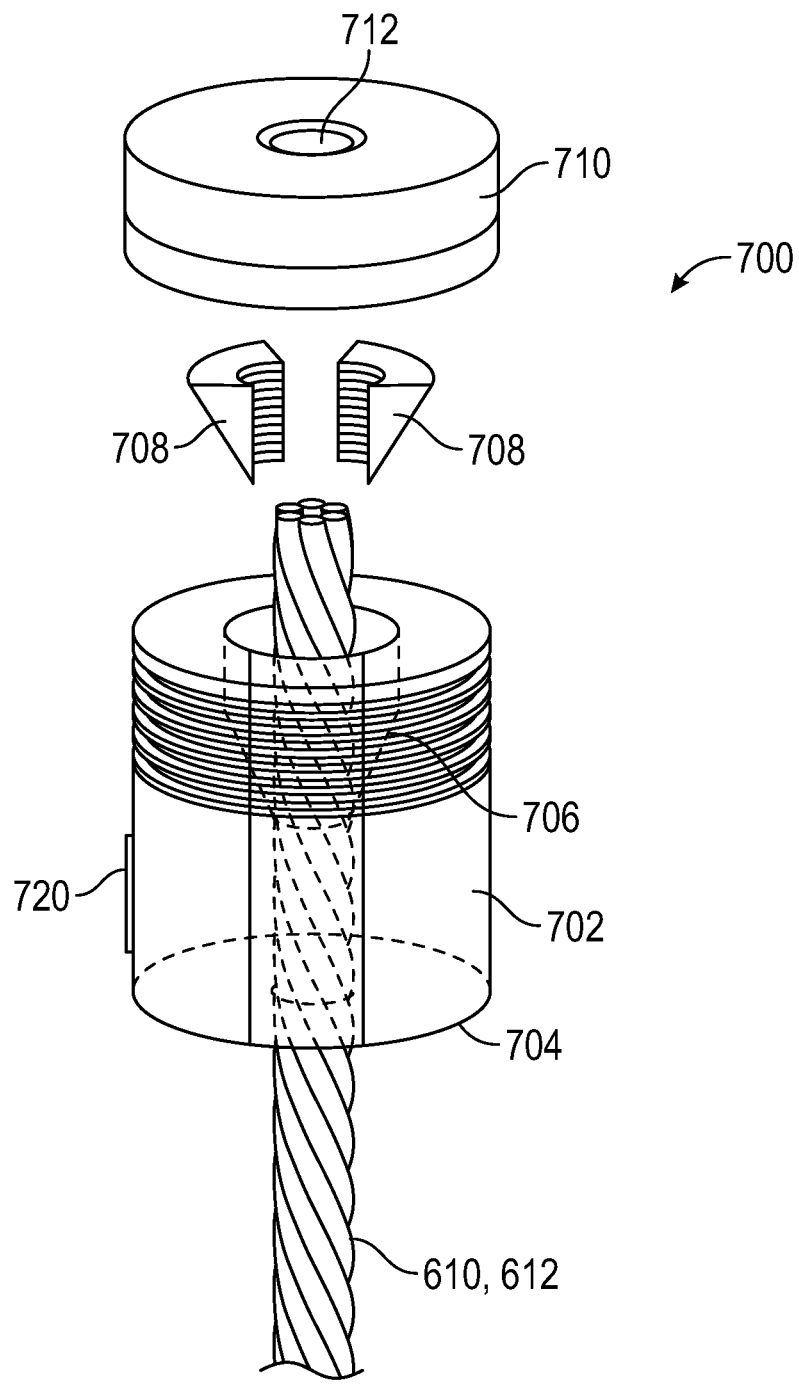
FIG. 7 illustrates one of many possible embodiments of a tension cable nut useful with the inventions disclosed herein.

FIG. 7 illustrates a preferred tension component fastener 700 suitable for use with a wire rope tension component 610, 612. The fastener comprises a body 702 have an end surface 704 configured to contact the tension bolster 500 about the tension component opening 508. The body may be fabricated from metal stock, such as bar stock. An opening is formed through the body 702 and is configured to accept the wire rope component 610, 612, as illustrated. The end opposite surface 704 may comprise external threads for receiving an external cap 710. Inside the body 702, and collinear with the wire rope opening, an angled surface 706, such as a conical surface, is formed. A plurality, and preferable at least three, wedge lock elements 708 are configured to engage the angled surface 706 and to simultaneously engage the wire rope. Those of skill in the art having benefit of this disclosure will appreciate how this embodiment of a fastener 700 facilitates tensioning the tension component 610, 612 and locking in that tension by inserting the wedge lock elements 708 into the body.

To prevent the wedge lock elements 708 from working loose or loosening during lifting or transporting of the foundation system, a cap 710 may applied, such as by threading on to the body 702. The cap may include internal components that press on the wedge locks to keep them in place. The cap also may include an opening 712 through which a portion of the tension component may extend. Alternately, a C-clip or other similar structure may engage a groove in the body to hold the wedge lock elements 708 in place. It will be appreciated that other and further tension component fasteners are contemplated by the inventions disclosed herein.

Because the tension components 610, 612 are part of the system and method for lifting and transporting a foundation system, it is beneficial to be notified if and when a tension components breaks or loses tension. In one embodiment of the present inventions, a strain sensing device, such as a strain gauge 720, may be utilized to detect when the tensile load imposed on the tension component 610, 612 is lessened or eliminated. Additionally, strain gage 720 may be used to determine when the correct amount of tension has been applied to the tension component 610, 612.

Figure 8:
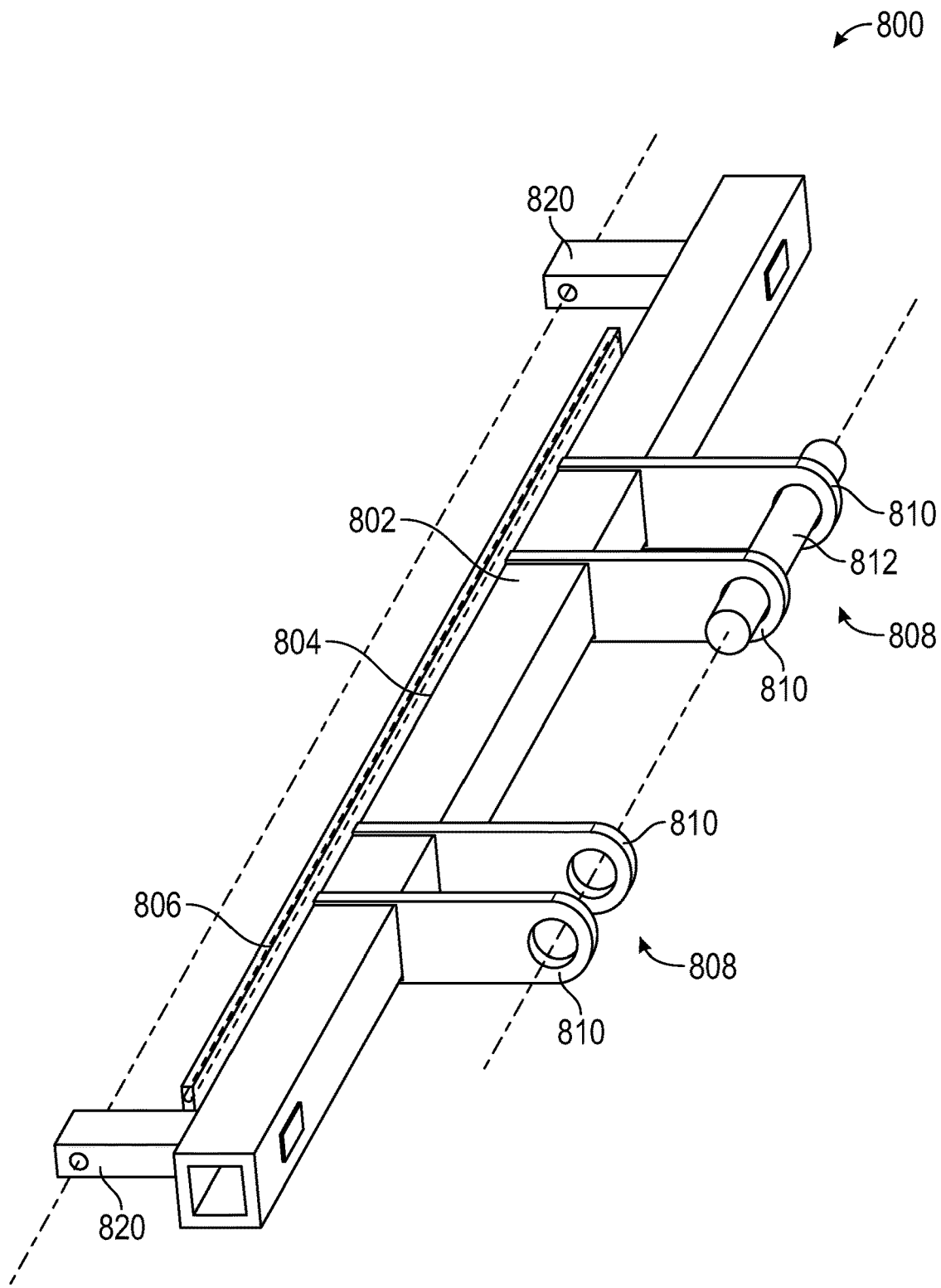
FIG. 8 illustrates a one of many possible embodiments of a compression bolster suitable for use with the modular foundation systems disclosed herein.

FIG. 8 illustrates aspects of an embodiment of a compression bolster 800 configured to operatively couple with the foundation systems disclosed herein to aid the lifting and transporting of foundation systems. The compression bolster 800 may comprise a body or frame 802 having a surface 804 configured to compressively engage an end 108, 110 of foundation system 100 adjacent the top or floor surface 102. It is preferred, but not required, that the surface 804 comprise a pad 806, such as high-density rubber or plastic, to provide and interface between the compression bolster and the foundation system 100. It will be appreciated that the compression bolsters (one at each end) are configured to apply a compressive force to the foundation system 100 sufficient to allow the foundation system 100 to be lifted and transported without the foundation system experiencing a tensile or other failure mechanism. To this end, the compression bolster 800 may comprise at least one reaction point 814 through which a compressive force may be applied to the compression bolster 800. As illustrated in FIG. 8, the compression bolster comprises two reaction points 808, each comprising a set of lugs 810 with a structural member 812, such as a rod, extending between them. It is preferred that the reaction point(s) allow for a compressive force to be evenly and uniformly applied to the foundation system along the length of the bolster 800.

Other embodiments of compression bolster 800 are contemplated by these inventions. For example and not limitation, for a 12' by 40' foundation system it is preferred that the compression bolster 800 comprise two reaction point sets, where each set is located adjacent an end of the frame 502 (as illustrated in FIG. 8), and where each set comprises four lugs 810 and two members 812. See for example FIG. 10. Still further a third reaction point 808 may be disposed between the two reaction point sets described above to more evenly distribute the compression load to the foundation system 100.

Figure 9:
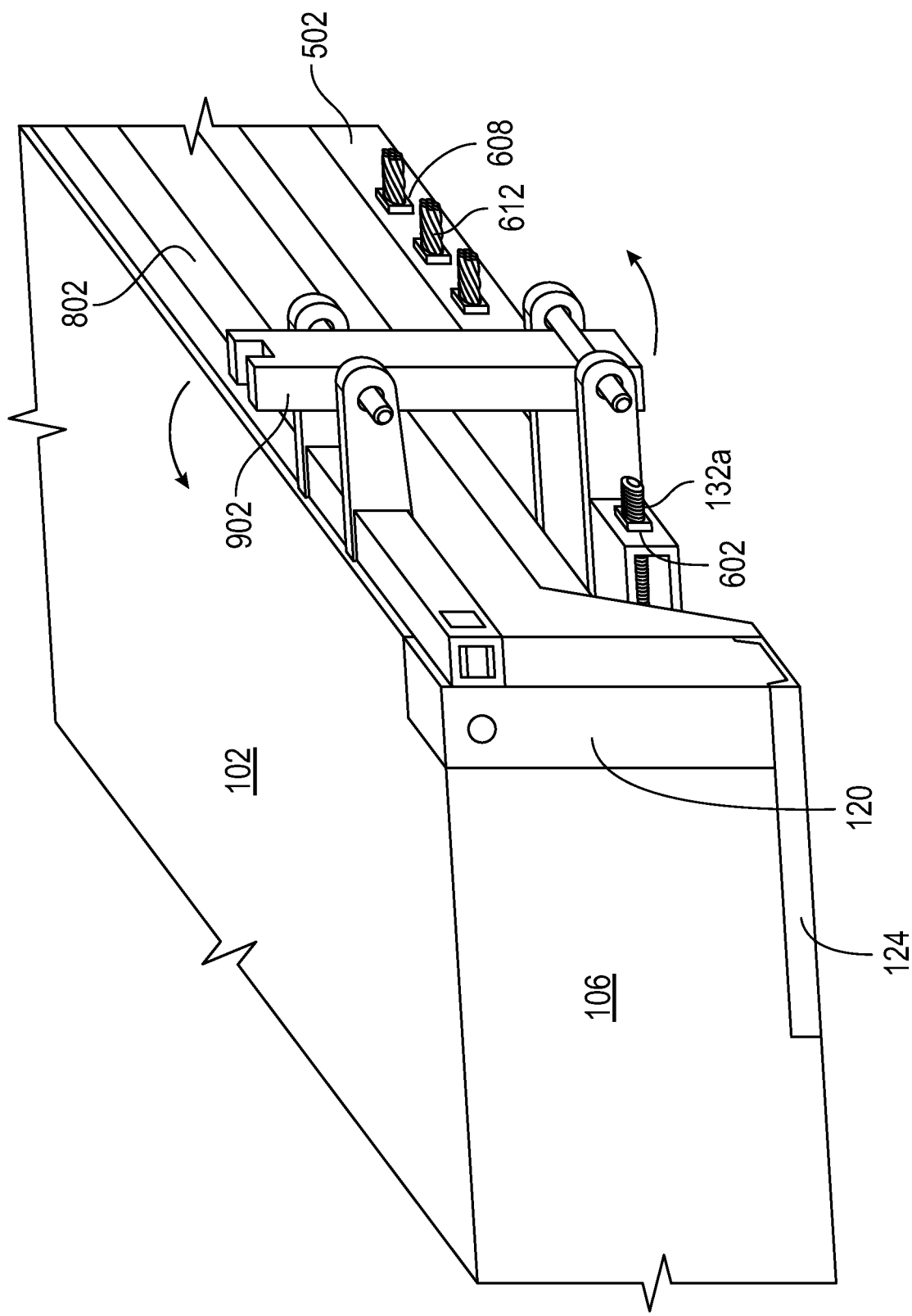
FIG. 9 illustrates a modular foundation system to which a tension bolster and compression bolster are operatively coupled.

FIG. 8 also illustrates optional guide pins 820 extending away from the bolster 800 toward the foundation system 100 and configured to interface with corresponding receptacles formed in the foundation system 100, such as illustrated in FIG. 9.

FIG. 9 illustrates a foundation system, such as foundation system 100, with a compression bolster 802 and a tension bolster 502 operatively coupled thereto. It will be appreciated that there is a similar compression bolster 802 and a tension bolster 502 operatively coupled at the other end of the foundation system 100 as well. The tension bolster 502 is shown attached to the safety lifting bar 132*a* with nut 602. Tension components 608 and corresponding fasteners 612 are also shown. It will be appreciated that the two tension bolsters are under tension supplied by the tension components. The compression bolster 802 is shown coupled to the foundation system 100 adjacent the top surface 102. The optional guide pin 820 is shown loosely interfacing a receptacle in the reaction column 120. Also illustrated in FIG. 9 is a load arm 902. The load arm 902 is configured to interface with one or more of the reaction points 514 on the tension bolster 500 and one or more of the reaction points 808 on the compression bolster 800. As will be described further below, a force applied to the load arm is reacted by the tension bolster and causes a compressive or clamping force to be applied by the compression bolster 800 to the foundation system.

Figure 10:
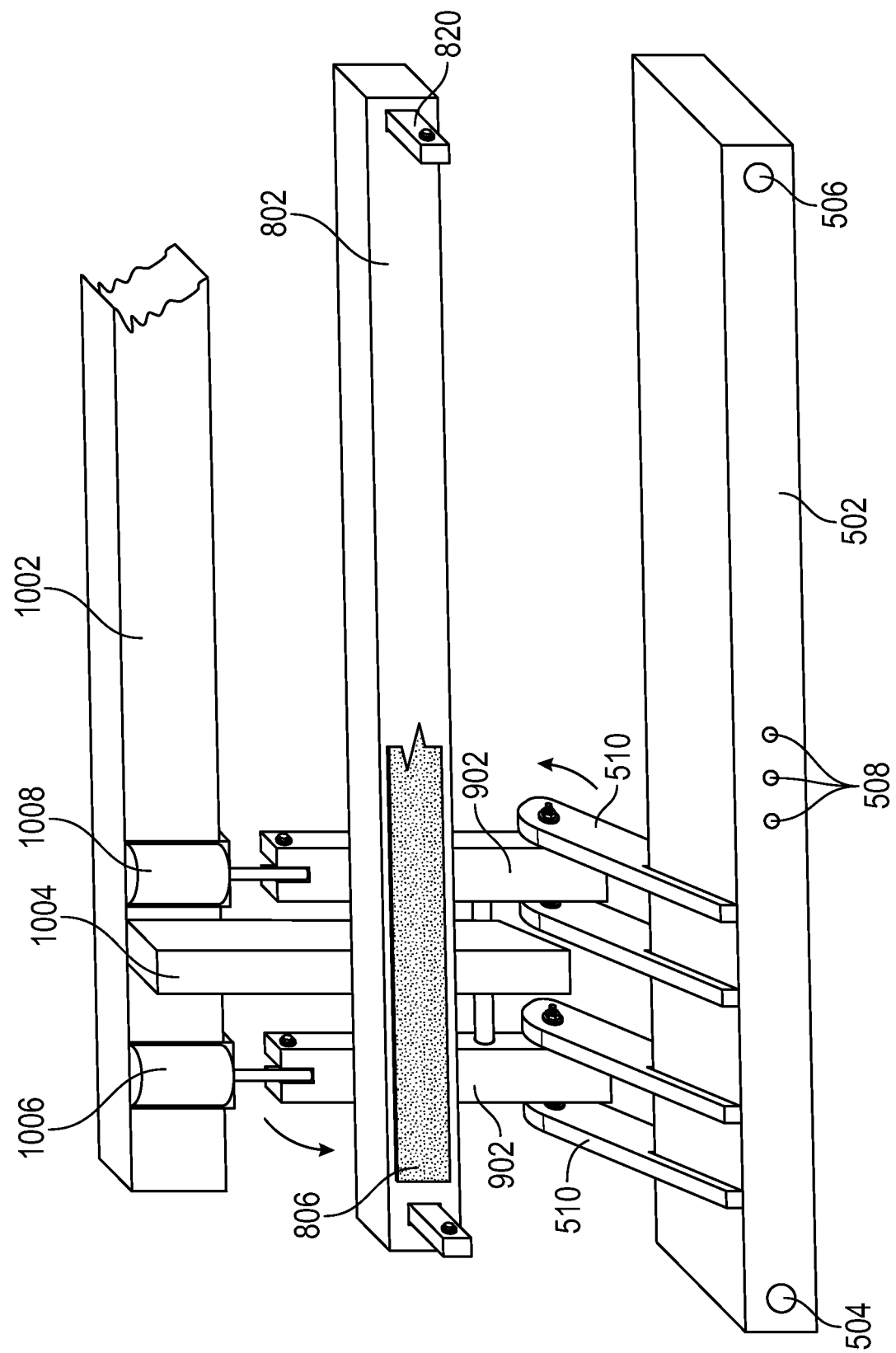
FIG. 10 illustrates a tension bolster and a compression bolster operatively coupled to a portion of one of many possible embodiments of a lifting system.

FIG. 10 further illustrates how the two bolsters work together to clamp the foundation system for lifting or transporting. A load frame 1002 may comprise one or more legs 1004, each of which may support one or more load arms 902. As shown, each load arm 902 engages a tension bolster reaction point adjacent on one end, and also engages a compression bolster reaction point 808. Another end of the load arm 902 may be coupled to a force-producing device 1006, such as a hydraulic cylinder or linear motor. The load frame 1002 may be, and preferably is, part of a bogie (not shown) as described in my other patents and incorporated herein by reference.

Figure 11:
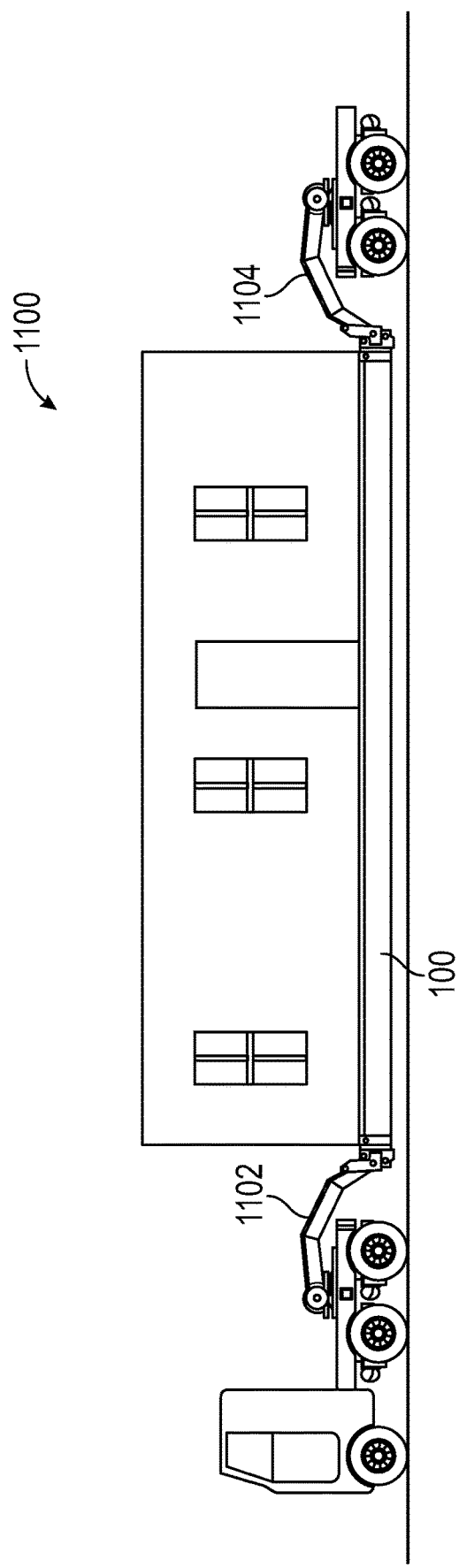
FIG. 11 illustrates a modular foundation system according the present inventions being transported.

FIG. 11. Illustrates a modular foundation system 100 with a structure 1100 erected thereon being lifted and transported according to the present inventions. Bogies 1102 and 1008 supply the compressive and lifting force, and can adjust the height of the foundation system 100 above the roadbed as needed to clear obstacles, such as railroad crossing and underpasses.

Figure 12:
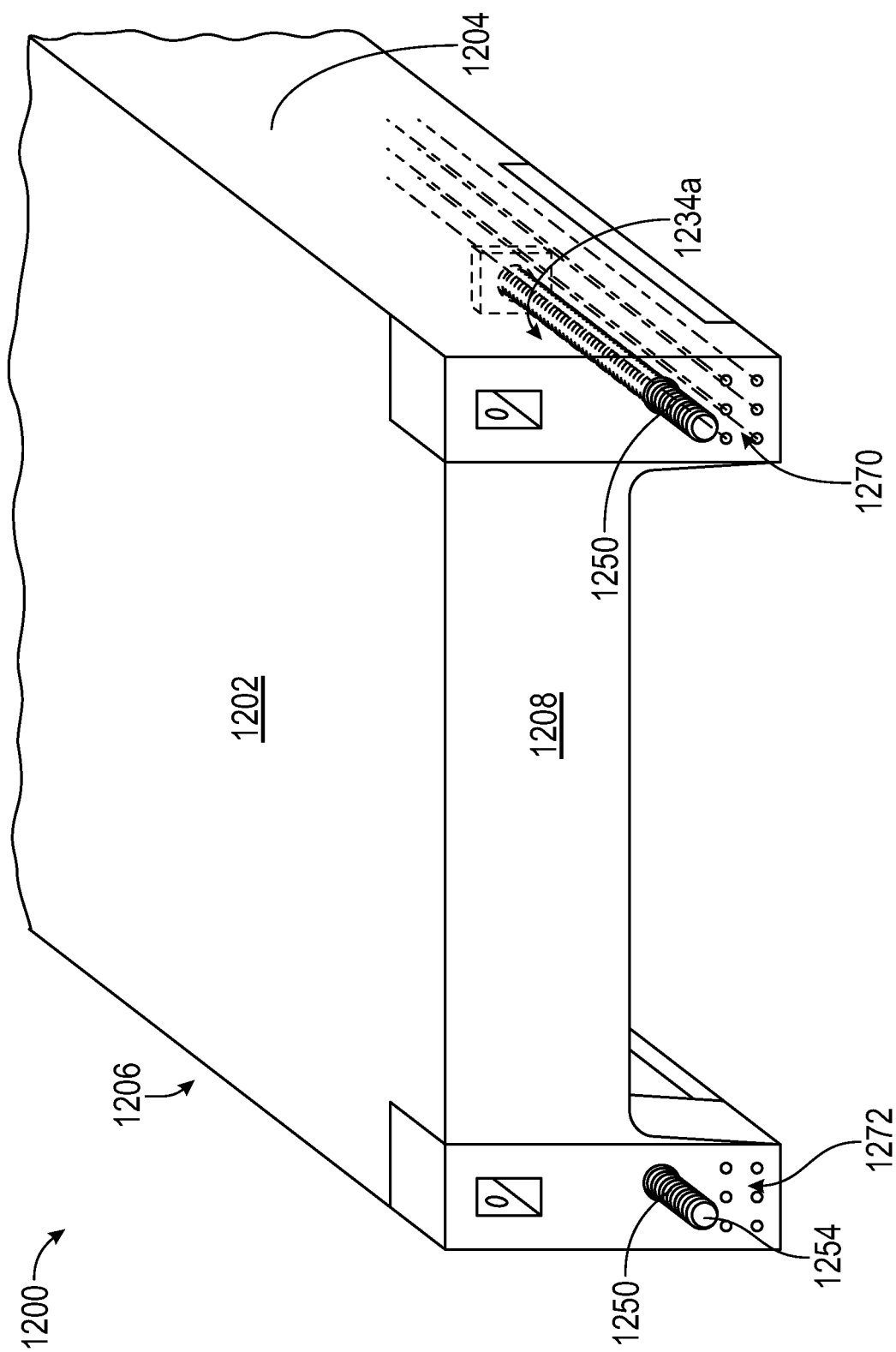
FIG. 12 illustrates one of many possible alternate embodiments of a modular foundation system incorporating one or more of the inventions disclosed herein.

FIG. 12 illustrates another embodiment of a foundation system according to the inventions disclosed herein. Foundation system 1200 is similar to foundation system 100 described above in most respects. However, in this embodiment, the safety lifting bars 1250 may be embedded in the side beams 1204 and 1206.

Figure 13:
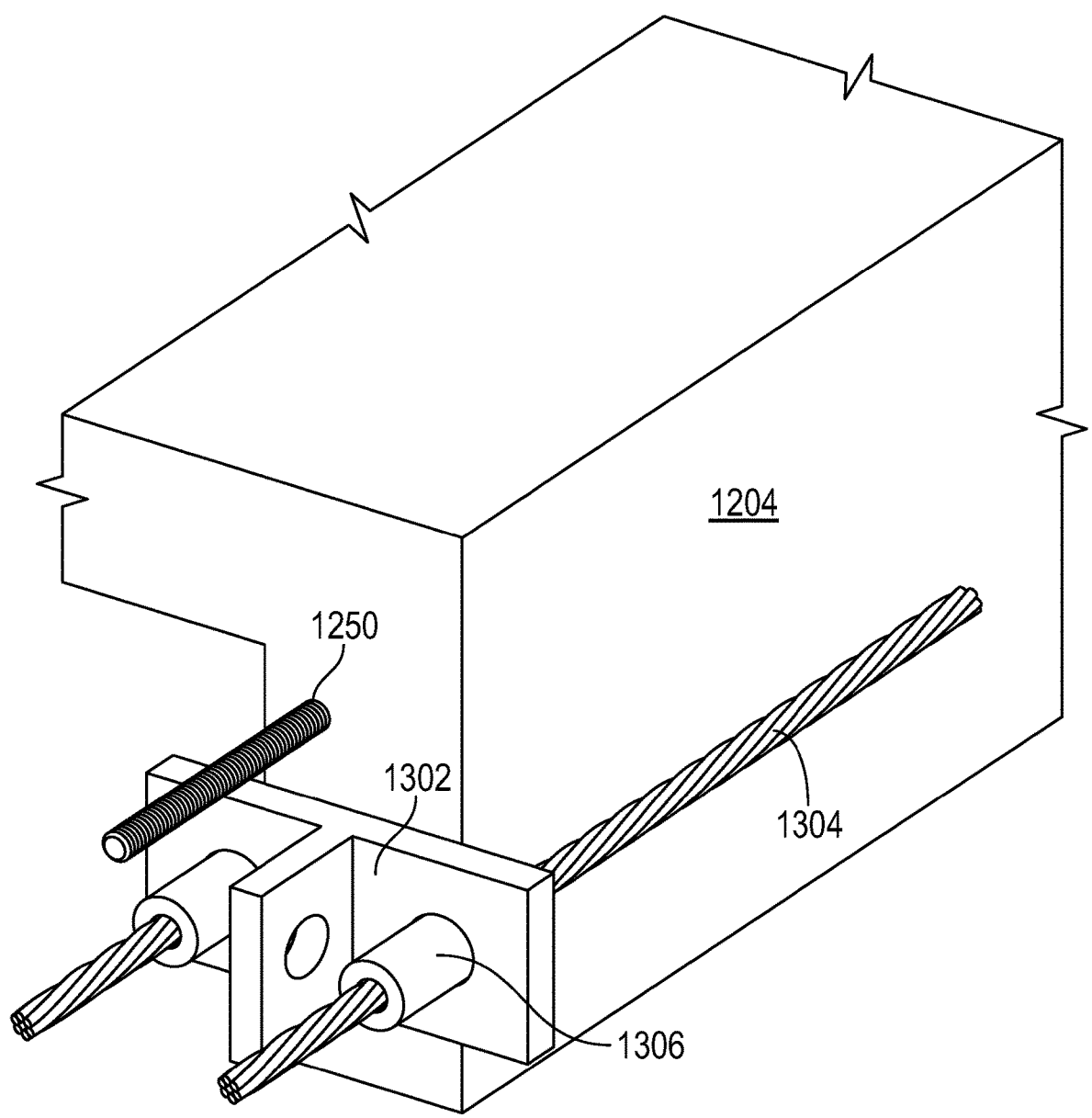
FIG. 13 illustrates portions of one of many possible embodiments of a tension bolster useful with the modular foundation system illustrated in FIG. 12.

FIG. 13 illustrates a tension bolster 1302 suitable for use with this type of foundation system 1200. The tension bolster 1302 may comprise a T-plate having a plurality of openings for tension components 1304. The T-plate preferably has a surface 1306 configured to compressively engage the foundation system 1200, and may utilize a high-density rubber or plastic pad as described above. It is understood that there is a similar T-plate at the opposite end of the foundation system 1200 and two or more tension components 1304 span between the tension bolsters 1302 on the inside and the outside of the side beam 1204. Suitable tension is applied to the tension components 1304 and the tensile force is locked in with use of tension component fasteners 1306, such as described above.

Figure 14:
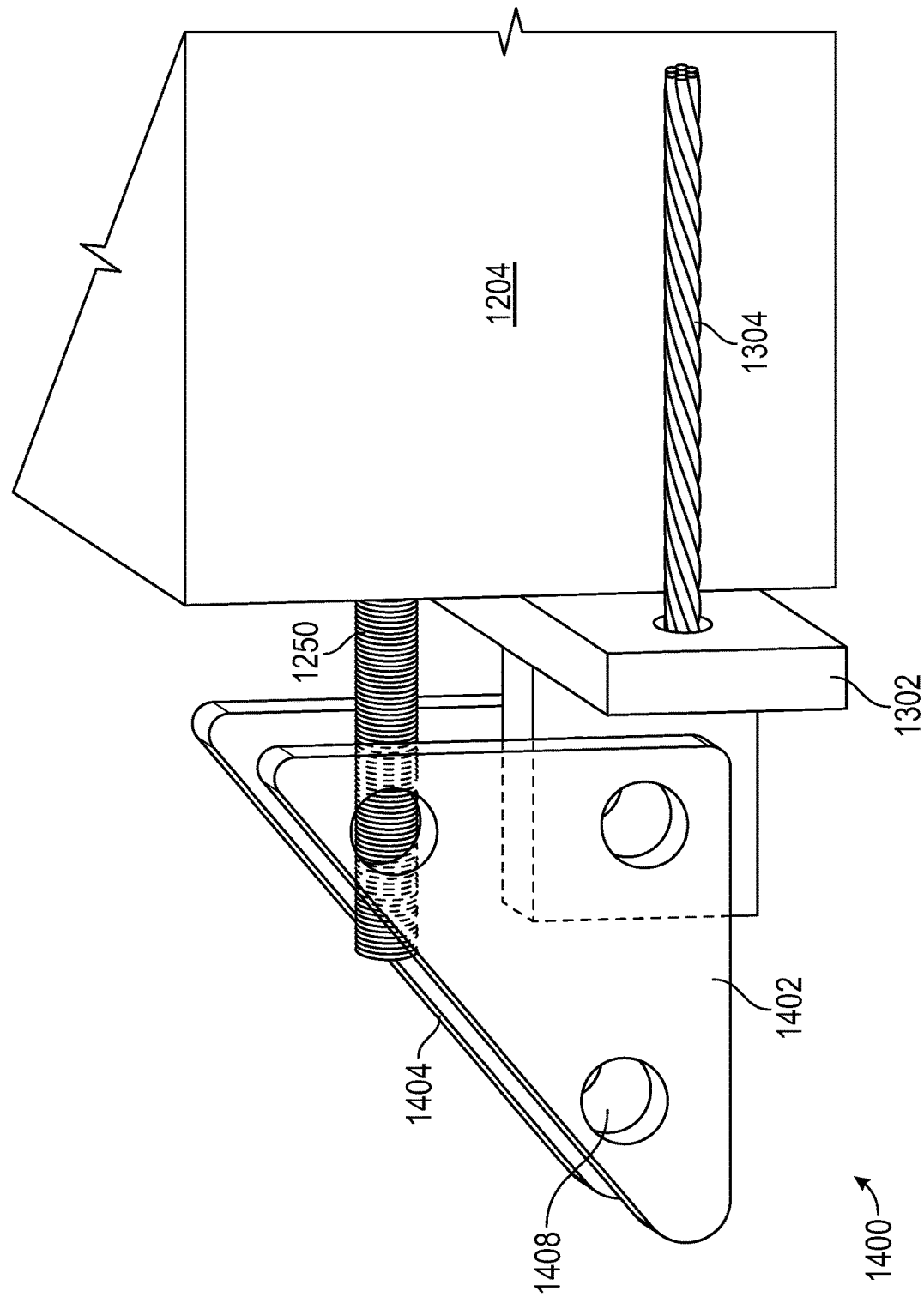
FIG. 14 illustrates other portions of the tension bolster of FIG. 13 useful with the modular foundation system illustrated in FIG. 13.

To lift or to lift and move modular foundation system 1200, a reaction point assembly 1400, such as illustrated in FIG. 14 may be used. Reaction point assembly 1400 may comprise two plates configured to be coupled to the tension bolster 1302 as illustrated, and to securely couple to the safety tension bar 1250. An opening 1408 in the plates allows a load arm, such as described above, to interface with the tension bolster 1302. Alternately, a structural member or rod (not shown) may be supplied for interfacing with the load arm. It will be appreciated that this type of tension bolster 1302 and reaction point assembly 1400 will be used at each of the four corners of the foundation system 1200 and may be used in conjunction with the compression bolster described above.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A modular foundation system, comprising:
a top surface on which a structure may be erected, a first and a second side beam, a first and a second end beam, and four corners defined by intersections of the first and second side beams and intersections first and second end beams;
four load reaction columns, a single of the four load reaction columns embedded in the foundation system at each of the four corners;
a plurality of pre-tensioned wire cables embedded in the foundation system along each side beam spanning between the load reaction columns embedded in the corners associated with each side beam;
a lifting safety bar adjacent each end beam, each lifting safety bar comprising a length of rod a first portion of which is embedded in the foundation system and a second portion of which is exposed and not embedded in the foundation system, and an end of the second portion is substantially flush with an outer surface of the end beam to which the lifting safety bar is adjacent; and
a first and a second tension bolster region defined by each end beam and the first and second side beams, and each of the first and second tension bolster regions having a depth defined by the second portion of the lifting safety bar.

2. The modular foundation system of claim 1, wherein the foundation system comprises a concrete matrix with metal reinforcement.

3. The modular foundation system of claim 2, wherein the four load reaction columns comprise structural steel.

4. The modular foundation system of claim 1, wherein the plurality of pre-tensioned wire cables is each a steel wire cable.

5. The modular foundation system of claim 4, wherein the plurality of wire cables in each side beam comprises 6 wire cables each tensioned to between approximately ½ Kip and approximately ¾ Kip, inclusive.

6. The modular foundation system of claim 1, wherein the second portions of the lifting safety bars comprise threads of a threaded fastener system.

7. The modular foundation system of claim 6, wherein the lifting safety bars each comprise a bonding plate configured to operatively bond the lifting safety bar within the foundation system.

8. The modular foundation system of claim 6, further comprising a first tension bolster located in the first tension bolster region, and a second tension bolster located in the second tension bolster region.

9. The modular foundation system of claim 8, wherein the threaded portions of the lifting safety bars extend through openings in the first and second tension bolsters, and the first and second tension bolsters are removably secured to the foundation system by threaded nuts engaging the threaded lifting safety bars.

10. The modular foundation system of claim 9, further comprising a plurality of removable tension components extending between the first and second tension bolsters.

11. The modular foundation system of claim 10, wherein each tension component is ½ inch diameter wire cable.

12. The modular foundation system of claim 11, wherein each tension component applies a tensile force to the first and second tension bolsters of between approximately 500 $lb_f$ and approximately 1,000 $lb_f$, inclusive.

13. The modular foundation system of claim 12, further comprising removable fasteners configured to engage the first and second tension bolsters and to lock in the tensile force in the tension components extending between the first and second tension bolsters.

14. The modular foundation system of claim 1, wherein each reaction column comprises an aperture adjacent the top surface of the foundation system, and wherein each aperture is configured to receive a portion of a compression bolster.

15. The modular foundation system of claim 1 further comprising a first tension bolster located in the first tension bolster region, and a second tension bolster located in the second tension bolster region, a plurality of removable tension components extending between the first and second tension bolsters, and wherein each tension component applies a tensile force to the first and second tension bolsters of between approximately ½ Kip and approximately 1 Kip, inclusive.

16. A modular foundation system, comprising:
a flat, rectangular top surface on which a structure may be erected;
a first and a second side beam integral with and supporting the top surface;
first and second end beams extending between the first and second side beams at ends of the top surface;
four load reaction columns each of which is embedded in an end of the first and second side beams, each load reaction column comprising a portion that is positioned at a bottom surface of each the first and second side beams;
a plurality of pre-tensioned wire cables embedded within each side beam and spanning between the reaction columns;
a lifting safety bar adjacent each reaction column below the top surface and comprising a length of rod, a portion of which is securely embedded in the foundation system and a remaining portion of which is exposed and not embedded in the foundation system, and an end of the remaining portion is threaded;

first and second tension bolster regions associated with each end beam and lifting safety bars, the first and second regions configured to receive a first and a second tension bolster;

a first tension bolster removably secured in the first tension bolster region by the lifting safety bar;

a second tension bolster removably secured in the second tension bolster region by the lifting safety bar; and a plurality of removable tension components extending between the first and second tension bolsters.

17. The modular foundation system of claim 16, wherein the foundation system comprises a concrete matrix with metal reinforcement.

18. The modular foundation system of claim 16, wherein the plurality of wire cables in each side beam are each tensioned to between approximately 500 $lb_f$ and approximately 750 $lb_f$, inclusive.

19. The modular foundation system of claim 16, wherein the plurality of tension components is selected from the group consisting of wire rope, cables, and rods.

20. The modular foundation system of claim 19, wherein each tension component applies a tensile force to the first and second tension bolsters of between approximately 500 $lb_f$ and approximately 1,000 $lb_f$.

* * * * *